Oct. 9, 1951 R. PELLETIER 2,570,704
CUTOUT SWITCH FOR BATTERIES OR THE LIKE
Filed Nov. 4, 1948 2 Sheets-Sheet 1
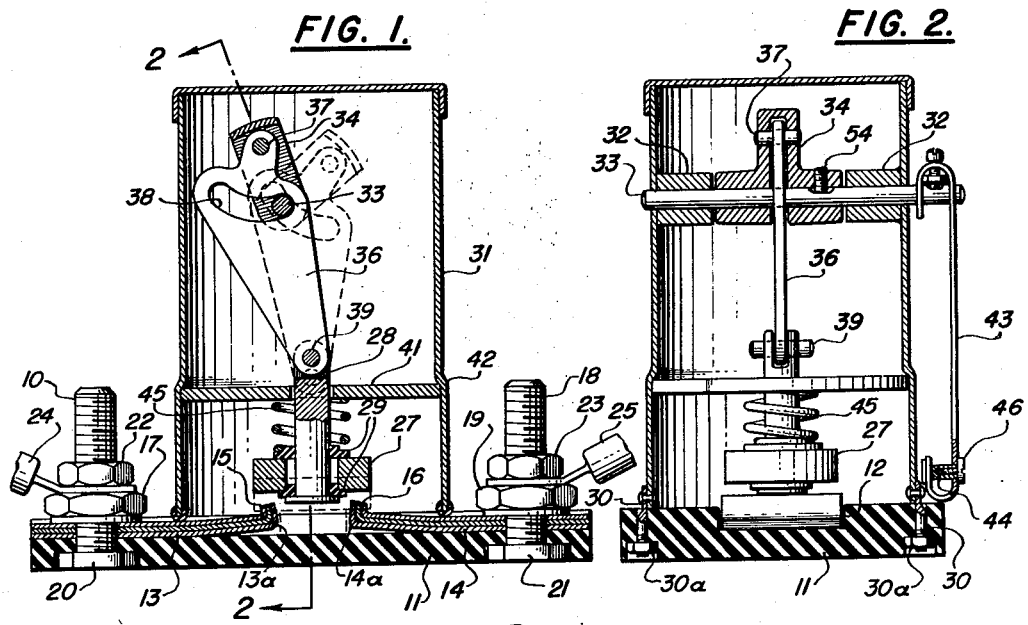
INVENTOR
ROGER PELLETIER
BY
Morris Relson
ATTORNEY Oct. 9, 1951 R. PELLETIER 2,570,704
CUTOUT SWITCH FOR BATTERIES OR THE LIKE
Filed Nov. 4, 1943 2 Sheets-Sheet 2
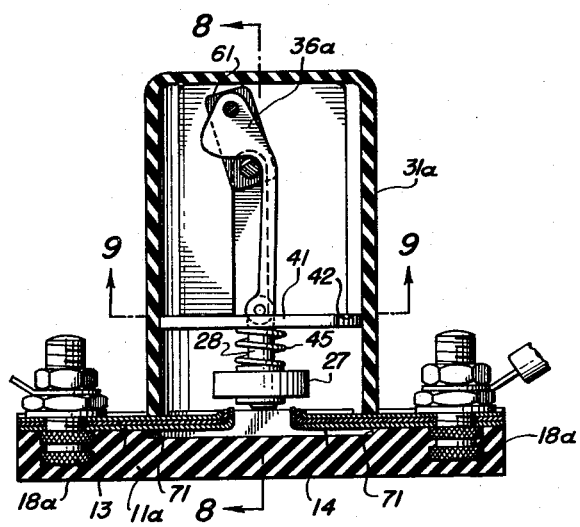
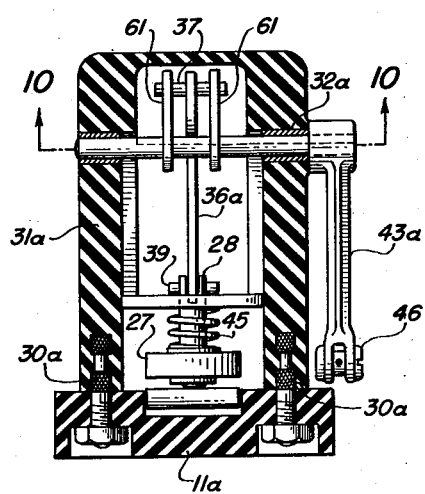
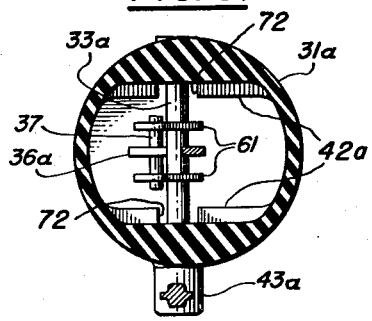
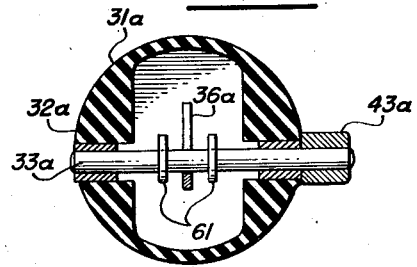
INVENTOR
ROGER PELLETIER
BY Morris Relson
ATTORNEY Patented Oct. 9, 1951

2,570,704

UNITED STATES PATENT OFFICE 2,570,704

CUTOUT SWITCH FOR BATTERIES OR THE LIKE

Roger Pelletier, Seaford Harbor, N. Y.

Application November 4, 1948, Serial No. 58,340

7 Claims. (Cl. 200—163)

The present invention relates to the art concerning devices for automotive apparatus, and more particularly relates to improved devices for interrupting the battery circuit of such automotive apparatus.

In ordinary automotive apparatus, such as passenger automobiles, buses and trucks, the primary source of electrical power is the storage battery, which supplies excitation for the ignition, horn, and lights, as well as for many accessories, such as heater, radio, cigarette lighter, clock, fan, etc. With the multiplicity of such electrical devices in the conventional modern car, it is very easy for the driver to forget or overlook opening all the many switches which independently control the various electrical devices. Inadvertent failure to turn off lights or radio or heater or other accessory has many times resulted in a discharged battery, which may be seriously injured when next the car is attempted to be started, or which may create the trouble, expense, and delay of needing recharging before it can be used again.

The present invention provides a master cutout for the battery circuit so that actuation of a single control will completely electrically de-energize the entire car.

Furthermore, the present invention protects the car in case accidental short circuits occur. A common occurrence is a short-circuited horn, which continues to blow despite all efforts of the driver, resulting in battery discharge as well as embarrassment. Also present is the danger of fire from an accidental short-circuit, producing heat which can start an extremely damaging blaze which, especially in a crowded public garage or in a private garage attached to the house, can cause widespread damage to both property and life. The present invention provides a means for completely disconnecting the battery in such event, so that the resultant damage is suppressed.

In addition, by the present invention even the starter motor may be disconnected, so that theft of the car or unauthorized use of the car radio or heater may be inhibited, especially where the control is concealed as by locking in the customary glove compartment inside the car body.

Accordingly, the present invention provides an improved cut-out for automotive or like electrical systems, utilizing improved structure for efficiently attaining its purpose. In particular, an improved toggle arrangement is provided which is simple to fabricate and which is reliable and long-wearing in use.

Further objects and advantages of the present invention will become apparent from the following detailed description of preferred embodiments thereof, taken in conjunction with the accompanying drawings in which Fig. 1 is a vertical cross-sectional view of one form of the invention;

Fig. 2 is a similar view along line 2—2 of Fig. 1;

Fig. 3 is a fragmentary vertical cross-sectional view of a modification of Figs. 1-2;

Fig. 4 is an isometric view of a modification of one element of the prior figures;

Fig. 5 is an exploded isometric view of a further modification, in part;

Fig. 6 is a fragmentary exterior isometric view of the device of Figs. 1 and 2 using the modification of Fig. 5.

Fig. 7 is a cross-sectional elevation view of a further modification.

Fig. 8 is a cross-sectional elevation view along line 8—8 of Fig. 7.

Figs. 9 and 10 are further cross-sectional views along lines 9—9 and 10—10, respectively.

Referring to the drawings, Figs. 1 and 2 show two cross-sectional views, substantially at right angles to one another, of the battery cut-out switch of the present invention. As shown in these figures, the device comprises a base member 11 formed as a generally rectangular block of insulating material having a slot 12 formed longitudinally and symmetrically therein. Lying in the slot 12 and extending from opposite ends thereof are two sets of contact leaf springs 13 and 14 having nested up-turned ends 15 and 16 of varying heights, as shown in Fig. 1. The springs 13 are held in place by a terminal bolt 10 and lock-nut 17. Similarly, the springs 14 are held in place by the terminal bolt 18 and lock-nut 19. As shown in the figure, the heads 20 and 21 of terminal bolts 10 and 18 are recessed within the base 11. Further nuts 22, 23 on terminal bolts 10, 18 are adapted to retain the electric connecting cables 24, 25 serving to connect the switch in the desired circuit.

Cooperating with the upturned ends 15 and 16 of the contact springs 13, 14 is a short-circuiting conducting button 27 loosely retained on the end of a coupling stud 28 but insulated therefrom by insulating washers 29. A preferably cylindrical housing 31 is held down on base 11 by a pair of spade bolts 30 riveted to the side walls housing 31 and passing through the base 11 to which they are fixed by recessed nuts 30a. Housing 31 is provided with a pair of bushings 32 aligned along a non-diametral chord of the cylindrical housing 31, as shown in Fig. 1, for reasons discussed hereinbelow. Passing through the bushings 32 is a cross-shaft 33, to which is fixed a crank member 34, to which in turn is pivotally connected a connecting link 36, as by a pivot pin 37. Connecting link 36 is provided with an arcuate slot 38 through which shaft 33 normally freely passes. The other end of connecting link 36 is pivotally connected to the upper end of connecting stud 28, as by a pivot pin 39. A thrust washer 41 loosely surrounds the connecting stud 28 and is prevented from rising within the housing 31 by a retaining means shown as a shoulder 42. It will be understood that any other type of similar retaining means, such as depressions or detents, pressed or formed into the wall of housing 31 may be used in place of shoulder 42. A compression spring 45 extends between the thrust washer 41 and the insulating washer 29 for the contact button 27 and normally urges the contact button 27 downward into engagement with the contact spring tips 15 and 16.

An actuating lever arm 43 is connected to the cross-shaft 33 and is adapted to be coupled at its lower end to the end of a mechanical pull cable, such as 44, by a freely rotatable wire-retaining connection or clamp 46.

When the connecting link 36 is in the position shown in solid lines in Fig. 1, the end of the arcuate slot 38 of link 36 rests upon the cross-shaft 33 and prevents the connecting stud 28 and contact button 27 from descending into contact with the contact springs 15, 16 despite the compressive force exerted by the compression spring 45. As will be seen, considering the housing and base as the datum, the compression spring 45 exerts a downward force on button 27 which transmits this downward force to the coupling stud 28, which in turn exerts a pull downward on the connecting link 36. Since the pivot pin 37 in this position is to the left and below its uppermost point of travel, the pull on link 36 is transmitted to the pivot pin 37 which in turn tends to hold the crank arm 34 in the stable position shown in solid lines. Upon rotating lever arm 43, however, pivot pin 37 is rotated clockwise, as viewed in Fig. 1, by the action of the crank arm 34 to a position to the right of its uppermost position. In this position, the downward force of spring 45 urges the crank arm 34 clockwise, and slot 38 is made long enough so that there is no interference with the downward motion of connecting link 36, coupling stud 28 and button 27 until the full force of compression spring 45 pushes the contact button 27 against the contact spring tips 15 and 16, thereby closing the switch. This closed position is shown in the dotted lines of Fig. 1.

As shown in Fig. 1, the cross-shaft 33 is located offset from the vertical center line of coupling stud 28 for the following reasons. The major lift given to the connecting stud 28 occurs between the position of pivot pin 37 to the extreme right, as shown in dotted lines and its position to the right of and just below the extreme uppermost position of the pivot pin. During this lifting portion, it is desirable that the lifting force applied to the coupling stud 28 be as nearly vertical as possible to minimize any rubbing between the stud 28 and washer 41 or any side movement of the stud 28 which, as shown, is not retained by any bearing in order to simplify construction. This condition is assured by the offsetting of the cross-shaft 33 in the manner indicated, so that the cross-shaft 33 is on a vertical line preferably approximately halfway between the two vertical lines passing through the leftmost position of pivot pin 37 (shown in solid lines) and the center of stud 28.

As shown also in Fig. 1, the contact springs 13 are bent slightly upward at 13a, 14a and terminate in generally vertically extending tips 15, 16 whose ends are located different distances above the base 11. In this way contact is made by the contact button 27 consecutively with the respective contact springs 15 or 16. Furthermore, by this arrangement the uppermost edges of the contact spring tips 15, 16 are caused to bend slightly toward the center as the contact button 27 descends, thereby providing a wiping action which serves to automatically maintain the contacts in a clean condition and to scrape off any oxide coating or any dirt or foreign matter which may accumulate thereon.

While the coupling link 36 is shown in Figs. 1 and 2 as having an arcuate slot engaging the cross-shaft 33, which construction is preferred for reasons of strength, it is to be noted that only the right end of the slot (as seen in Fig. 1) ever actively engages the cross-shaft 33, since the left end of the slot, as shown by the dotted position of the switch, is free from the cross-shaft 33. Accordingly, the link 36 may take the shape shown in Fig. 3, which is essentially a hook element, whereby in the solid-line position of the switch, the hook 36a is held up by the cross-shaft 33 from which it is free in the dotted position.

For simplification, the crank arm 34 may be formed as shown in Fig. 4, wherein it is illustrated as formed from a solid block 50 merely by milling a slot 51 in the center thereof and drilling two holes 52, 53, respectively, for the pivot pin 37 and the cross-shaft 32. A suitable set-screw hole 54 may be provided for clamping the crank arm to the cross-shaft as in Fig. 1.

As a simpler construction, the cross-shaft 33 may be formed with a flat portion as shown at 33a in the exploded fragmentary view of Fig. 5. In this instance, the crank arm is formed by a pair of webs 61 having non-circular holes 62 adapted to cooperate with cross-shaft 33a so as to rotate therewith, and being apertured at 63 to receive the pivot pin 37, which also passes through the connecting link 36a shown here as the form illustrated in Fig. 3, although it will be apparent that the form shown in Fig. 1 may also be utilized. It will be understood that the remainder of the construction in Fig. 5 is identical with Figs. 1 and 2.

Fig. 6 illustrates in more detail the connection of the pull cable to arm 43. The cable is shown of the conventional Bowden wire type, having a sheath 55 in which freely slides a wire 56. The end of wire 56 is held in a clamp 46 which is freely rotatable in arm 43. The sheath 55 is firmly clamped to base 11 by a sheath clamp arrangement 58 of any suitable type. The wire 56 is actuated by a suitable control knob, mounted in any desired location, as in the glove compartment of an automobile or on the dash panel thereof.

When the cutout of the invention is used in an automobile, one terminal bolt, as 16, is connected directly to the ungrounded terminal of the auto battery. The other terminal bolt, as 18, is then connected to all the electrical-energy-utilizing devices in the automobile, including ignition, lights, horn, starter, heater, radio, etc.

Figs. 7–10 illustrate a further modification of the invention which uses a molded housing and base, both preferably of thermoplastic or thermosetting material. Base 11a is similar to base 11 of prior figures, but includes a step 71 at each end of slot 12. The stepped, nested contact springs 13, 14 now are flat, the steps 71 permitting flexure thereof, with the same wiping action as in prior forms of the device. Terminal bolts 18a are shown as knurled at one end, these ends being molded into the base 11a. The contact button and linkage arrangement are as in Fig. 5, although it will be understood that the connecting link of Fig. 1 may be used.

The housing 31a has bushings 32a molded therein, providing bearings for cross-shaft 33a. Also, a shoulder 42a is provided for thrust washer 41. For ease in assembly, housing 31a is provided with longitudinal grooves 72 in the inner wall aligned with bushings 32a. In assembling, the sub-assembly comprising control button 27, compression spring 45, washer 41, link 36, and webs 61 is first put together. Then a dummy shaft of length equal to the distance between the bottoms of grooves 72 is inserted through web holes 62, and the dummy shaft is inserted into the housing, sliding along grooves 72 until the ends of these grooves are reached. In this position the dummy shaft is lined up with the holes in bushings 32a. Then the actual cross shaft 33a is slid in, displacing the dummy shaft. Arm 43a is shown as of cast construction, but has the same function as arm 34. It will be understood that bushings 32a may be extended inwardly if desired, or spacing collars may be used, to properly locate webs 61 relative to housing 31a.

The present invention therefore provides an extremely reliable, sturdy and long-lived cutout especially adapted for use as a master cutout for automotive vehicles.

I claim as my invention:

1. A cut-out comprising a pair of terminals, a pair of sets of nested contact leaf springs each set connected to a respective terminal, a short-circuiting member adapted to interconnect said sets of springs in one position, and to be spaced from said sets of springs in a second position, and means for moving said member from one of said positions to the other, said means comprising a connecting stud loosely supporting said member at one end, a link pivotally connected to said stud at its other end, said link having an arcuate slot formed therein with center of curvature adjacent the end of said link remote from said pivotal connection, a cross shaft freely passing through said slot, a crank rotatable together with said cross shaft and pivotally coupled to said link, and spring means urging said short-circuiting member toward said contact springs, said link being adapted in one position of said shaft to maintain said shaft in engagement at the end of said slot, whereby said member is maintained out of engagement with said contact springs.

2. A cut-out comprising a pair of terminals, a pair of resiliently mounted spaced contacts each connected to a respective terminal, a movable short-circuiting member adapted to interconnect said contacts in one position and to be spaced from said set of contacts in a second position, and means for moving said short-circuiting member from one of said positions to another, said means comprising a connecting stud loosely supporting said member at one end, a link pivotally connected to said stud at its other end, said link having an arcuate edge formed therealong, a cross shaft adjacent said edge extending perpendicularly to the plane thereof and skew to the axis of said stud, a crank rotatable together with said cross shaft and pivotally connected to said link, an actuating arm fixed to said shaft and adapted to rotate said shaft upon actuation of said arm and spring means urging said short-circuiting member toward said contacts, said link in said second position of said short-circuiting member resting its arcuate edge on said shaft to hold said member spaced from said contacts in opposition to said spring means.

3. A cut-out comprising a pair of resiliently mounted spaced contacts, a movable short-circuiting member adapted to interconnect said contacts in one position thereof, means resiliently urging said member into engagement with said contacts, and means for moving said member away from said contacts, said last-named means comprising a stud holding said member, a link pivoted to said stud and having an arcuate edge intermediate the ends thereof, a cross shaft adjacent said edge extending perpendicularly to the plane thereof and skew to the axis of said stud, a crank rotatable with said shaft and pivoted to said link, said link being adapted to rest its arcuate edge on said shaft when in a position whereby said link-to-crank pivot is on one side of the line joining said link-to-stud pivot and the center of said shaft, to hold said stud and member spaced from said contacts in opposition to said resiliently urging means.

4. A cut-out as in claim 3, including a housing supporting said cross shaft at either end thereof, and a thrust washer engaging the interior of said housing and providing a fixed terminus for said resiliently urging means.

5. A cut-out as in claim 4, wherein said stud freely passes through an aperture in said washer.

6. A cut-out as in claim 3, wherein said stud is aligned between the two extreme positions of the pivotal connection between said link and said crank consequent upon rotation of said cross-shaft.

7. A cut-out comprising a pair of stationary contacts, a movable bridging member, a stud carrying said member, a link pivoted to said stud, said link having an arcuate slot therein, a cross shaft passing freely through said slot, a crank rotatable with said shaft and pivotally connected with said link at the center of curvature of said slot, a housing, said cross shaft being journaled in said housing at either end, said housing having an internal shoulder, a thrust washer freely surrounding said stud and engaged with said shoulder, and a compression spring extending between said shoulder and said bridging member for normally urging said member toward said stationary contacts.

ROGER PELLETIER.

REFERENCES CITED

The following references are of record in the file of this patent:

UNITED STATES PATENTS

| Number | Name | Date |
|---|---|---|
| 773,467 | Bradshaw | Oct. 25, 1904 |
| 1,132,786 | Mahoney | Mar. 23, 1915 |
| 1,285,675 | Gally | Nov. 26, 1918 |
| 1,520,258 | Penn | Dec. 23, 1924 |
| 1,902,524 | Roth | Mar. 21, 1933 |
| 1,954,907 | Williams | Apr. 17, 1934 |